Dec. 5, 1933.    L. M. WOOLSON    1,938,270
INTERNAL COMBUSTION ENGINE
Filed March 31, 1930    3 Sheets-Sheet 3

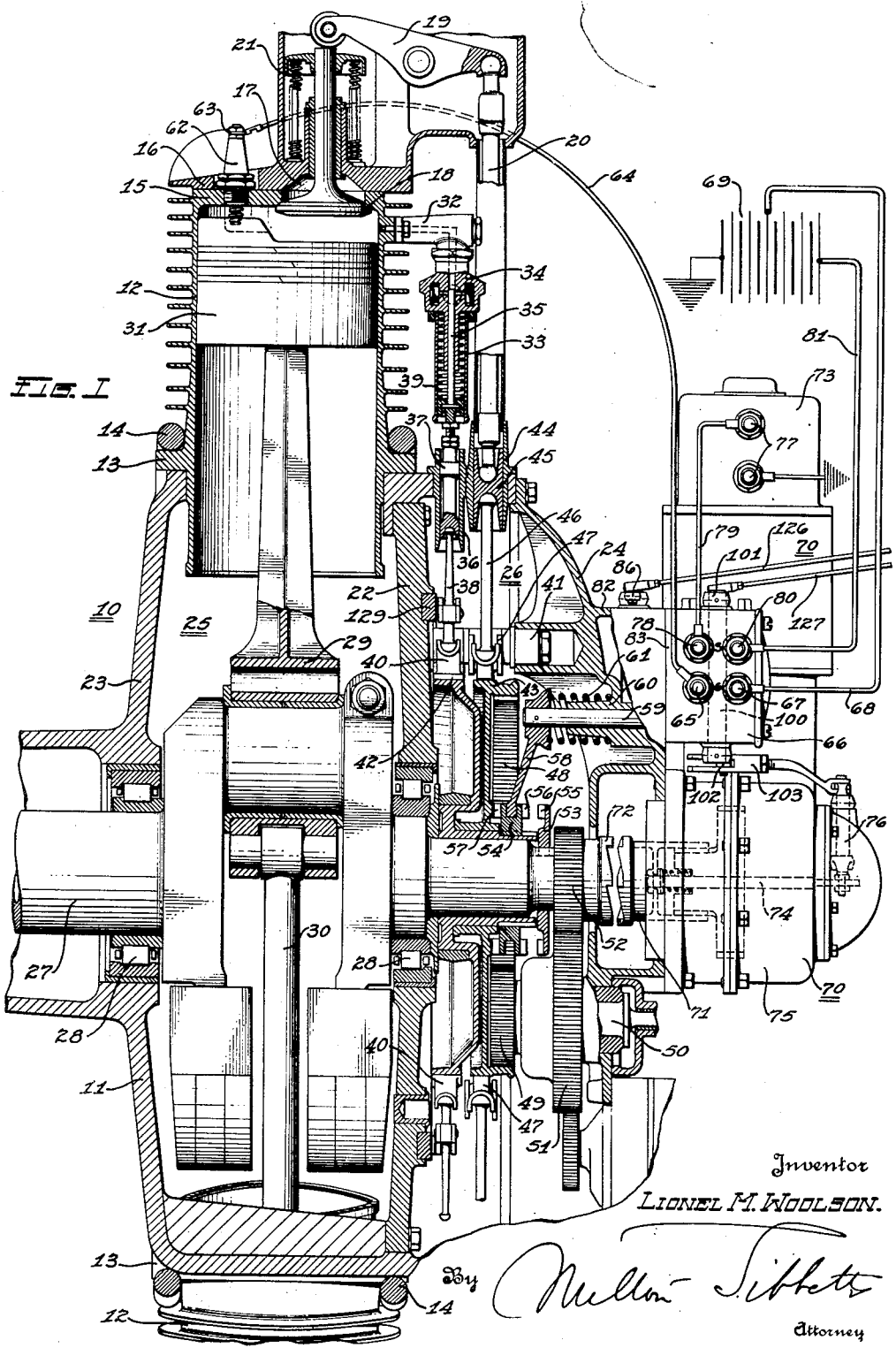

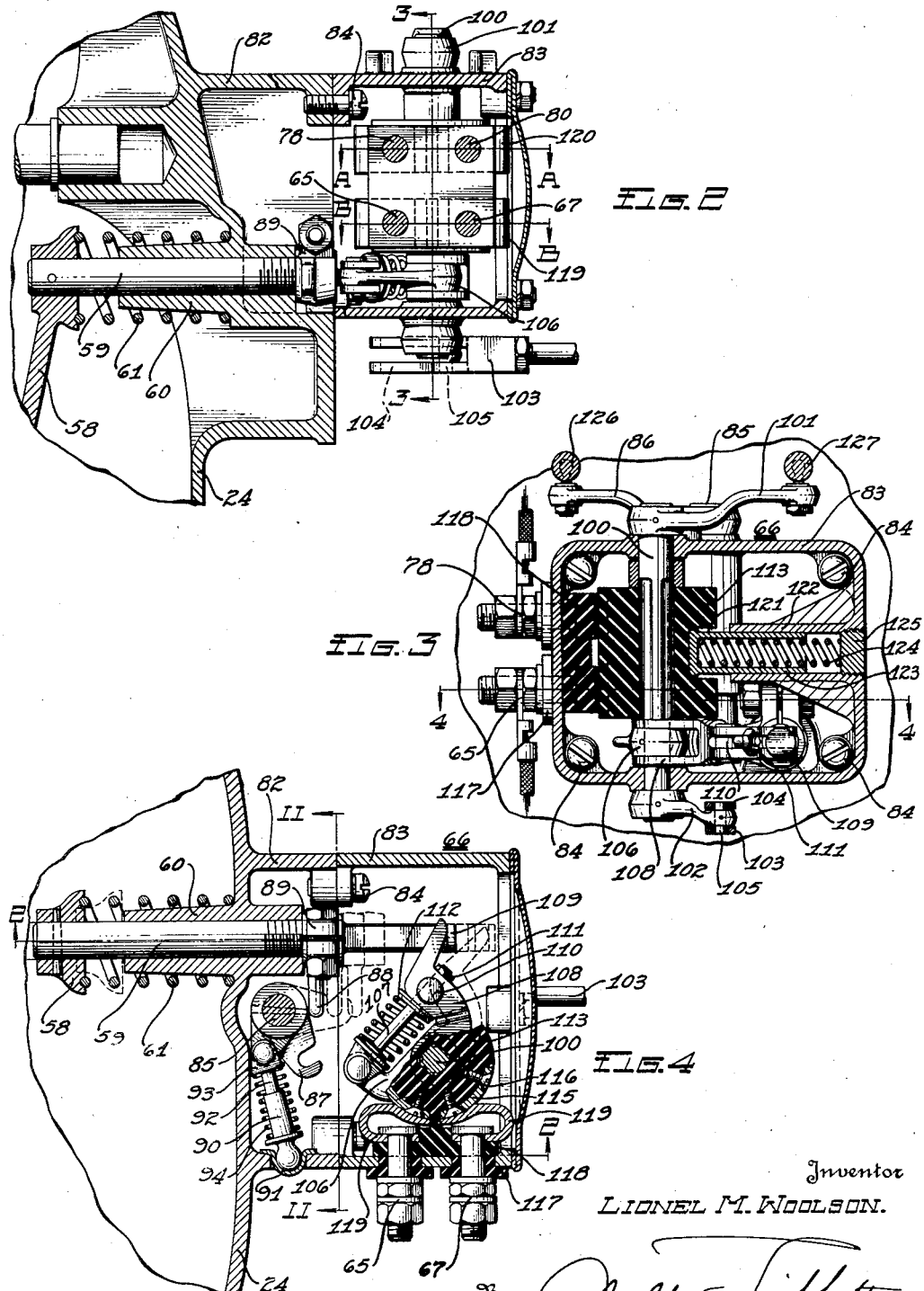

Inventor
LIONEL M. WOOLSON.
By Milton Tibbetts
Attorney

Patented Dec. 5, 1933

1,938,270

UNITED STATES PATENT OFFICE 1,938,270

INTERNAL COMBUSTION ENGINE

Lionel M. Woolson, Detroit, Mich., assignor to Packard Motor Car Company, Detroit, Mich., a corporation of Michigan Application March 31, 1930. Serial No. 440,188

57 Claims. (Cl. 123—179)

This invention relates to internal combustion engines and more particularly to mechanism for and the method of starting a compression-ignition type of engine.

Combustion occurs in a Diesel engine through heat caused by compression which is approximately five hundred pounds per square inch in the cylinders. Starting of a Diesel engine is difficult because considerable effort is required to cause such compression, and furthermore, because of the temperature which must be attained within the relatively cold cylinders in order to create a combustion condition. Also in starting of Diesel engines, the quantity of fuel injected is small and the slow turning of the crank shaft, when depended on for the fuel pressure, results in a considerably reduced pressure upon the fuel which is injected into the cylinders. As a result, the fuel is not atomized or projected into the compressed air in the cylinders in a manner which is sufficient to sustain combustion.

An object of the invention is to provide starting mechanism and a fuel injecting mechanism for Diesel engines which promote ease in starting.

A further object of the invention is to provide fuel injecting mechanism for a Diesel type of engine in which the movement of the injection stroke of the pump can be increased in speed for starting.

Still another object of the invention is to provide a starting mechanism for a Diesel type of engine in which the actuating mechanism for the fuel pump can be locked in an inoperative relation.

Another object of the invention is to provide a starting mechanism for a Diesel type of engine which includes glow plugs and an inertia starter which can both be energized and de-energized through a single control means.

A further object of the invention is to provide starting mechanism for a Diesel type of engine in which the manipulation of a single element will control the energizing and de-energizing of glow plugs, and an inertia starter, and also, will clutch and de-clutch the starter with the crank shaft and will cause a driving relation for the fuel injection mechanism at one of two different speeds.

Another object of the invention resides in the method of starting a Diesel engine whereby the liquid fuel charges are injected in an atomized condition and with a force into sufficiently compressed air charges so that the resulting mixture will ignite even though the crank shaft is being rotated slowly.

These and other objects of the invention will appear from the following description taken in connection with the drawings, which form a part of this specification, and in which:

Fig. 1 is a vertical sectional view of a radial type of internal combustion engine showing the association of the starting mechanism with the crank shaft and the fuel injection device;

Fig. 2 is a sectional view taken substantially on the line 2—2 of Fig. 4;

Fig. 3 is a sectional view taken on line 3—3 of Fig. 2;

Fig. 4 is a sectional view taken substantially on line 4—4 of Fig. 3 having the control cylinder broken away;

Figure 5:
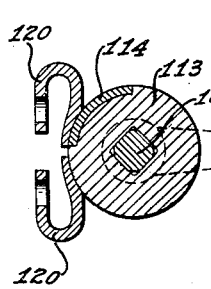
Fig. 5 is a sectional view taken on line A—A of Fig. 2 illustrating the neutral position of the control cylinder.

Referring now in detail to the drawings by characters of reference, 10 represents generally a radial type of internal combustion engine operating on a four-stroke cycle and Diesel principle, the engine illustrated being designed more particularly for use as the power plant for propelling an air ship. A barrel type of crank case 11 has nine cylinders 12 extending radially therefrom which are provided with flanges 13 secured against the crank case peripheral wall by a pair of circumferential bands 14 which are placed under sufficient tension to securely retain and compress the cylinders against the crank case, such bands serving also to distribute all of the explosion loads from the cylinders around the crank case. The cylinders are provided with an integral head 15, upon each of which is secured an auxiliary head 16, such sets of heads each being provided with a single Venturi passage 17 which extends therethrough and serve to admit the air charges into the cylinders and as an outlet for the exhaust. Controlling the inner end of each of such passages is a valve 18, which is opened by the rock lever 19 operated by the rod 20 and normally closed by a plurality of springs 21. The valve is open during the exhaust and inlet strokes of the piston and is maintained closed during the compression and power strokes of the piston.

The crank case is interiorly divided by a partition wall 22, and such wall together with the end walls 23 and 24 provide compartments 25 and 26. A crank shaft 27 extends through the crank case and is supported therein by the bearings 28, the crank throw being arranged within the compartment 25 for association with the connecting rod assembly which consists of a master rod 29 and a plurality of connecting rods 30 associated therewith, such rods extending into the cylinders and being connected with the pistons 31.

A fuel injecting device is associated, preferably, with each of the cylinders and each of such devices consists of a nozzle portion 32 and a pump portion 33, the pump portion including a barrel portion 34 having inlet ports extending therethrough and connected with a source of fuel supply. A plunger 35 is arranged to reciprocate within each barrel and control the inlet ports in its reciprocation. The stroke of the plunger, after closing the fuel inlet ports, determines the quantity of fuel injected through the nozzle into the cylinder and the plunger stroke is arranged to be regulated in order to thereby determine the fuel charges injected. It will be seen that under normal operation, when the engine is running at idling speeds, the movement of the plunger beyond the fuel inlet ports will be very slight, whereas when the engine is running under full load the plunger will move a maximum distance beyond the fuel inlet ports. Guide sleeves 36 extend through the crank case for the reception of plunger actuating rods 37 and associated with such rods, within the compartment 26, are links 38 which are actuated to move the rods 37 and the pump plungers in a direction to cause a fuel injection into cylinders, while a spring 39 is associated with the plunger to retract the same after each injection stroke. A rocker lever 40 is mounted upon a shaft 41 extending between the walls 22 and 24, adjacent each link member, and will cause the injection movement, while an actuating four lobe cam 42 is rotatably mounted upon the portion of the crank shaft extending into the compartment 26. It will be understood that the pump plunger pressure against the fuel will overcome a spring in the nozzle tending to close the nozzle valve to inject fuel into the compressed air charges in the cylinder.

A cam 43 for actuating the valve mechanism is arranged adjacent the cam 42 and the hub thereof is rotatably mounted upon the hub of the fuel cam. Bearing sleeves 44 extend through the crank case to receive a slidable member 45 with which the valve actuated rod 20 is associated and with which the link 46 within the compartment 26 is associated, there being a rocker lever 47 carried by the shaft 41 arranged intermediate each of the links 46 and the cam 43 so that the cam will move the valve actuating linkage to open the valve, and, as before stated, the springs 21 serve to maintain the rocker levers against the periphery of the cam 43 so that the valve will be normally maintained in a closed position.

For further details and a more complete showing and description of the engine and injection device, heretofore described, attention is directed to my co-pending application Serial No. 358,899, filed April 29, 1929.

In starting an engine of this character, some means must be provided for rotating the crank shaft in order to actuate the pistons, the fuel devices and the valves, and such rotation must be of sufficient energy to overcome a compression pressure of approximately five hundred pounds per square inch in the cylinders. Furthermore, I have found that the usual starting speed of the crank shaft is so slow that the fuel pump actuation will not exert sufficient pressure upon the fuel injected into the cylinders to cause a pressure sufficient to properly atomize the fuel when leaving the nozzle or to penetrate the compressed air within the cylinders to insure proper vaporization and intermingling of the fuel with the compressed air to result in quickly attained combustion. Due to such conditions, cranking of the shaft must be continued indefinitely with low temperature and to an undesirable extent even during high temperature conditions. It is the purpose of this invention to provide a method and mechanism whereby a Diesel engine can be quickly started and with a small amount of energy. To this end, I provide associated devices and mechanisms which consist of an inertia starter and glow plugs, operated from the battery, and mechanism for speeding up the rotation of the fuel actuating mechanism cam so that fuel will be sprayed into charges of air in the cylinders, when they are sufficiently compressed so that the mixture will ignite, at substantially the same degree of atomization and pressure as when the engine is running under load, such devices and mechanisms being regulated through the manipulation of a single control member.

As before stated, the cam 43 is rotatably mounted upon the hub of the cam 42, and this cam 43 is provided with interior teeth 48 with which a gear 49 meshes, such gear being mounted upon the shaft 50 which is rotated by the gear 51 meshing with the gear 52 fixed to the crank shaft. A slidable clutch element 53 is keyed to the crank shaft, adjacent the gear 52, and a clutch member 54 is splined to the outer end of the fuel cam hub. The clutch element 53 and the air valve cam 43 are provided with a plurality of spaced dogs 55 which are adapted to be engaged by similarly spaced dogs 56 and 57 formed on opposite sides of the clutch member 54. An arm 58 is carried upon a shaft 59 which extends through a bearing 60 projecting from the crank case cover 24 and is associated to engage and actuate the clutch element 54, such arm being pinned to the shaft 59 and being normally urged toward the cam 43 by the spring 61. It will be seen that the clutch member is normally positioned to rotate with the fuel cam hub, and that it can be moved into a neutral position between the dogs 55 of the clutch element and the dogs on the air valve cam, or it can be moved into driving engagement with the air valve cam or with the clutch element 53. The spring normally causes the clutch member 54 to engage in driving relation with the air valve cam 43 and when in such position the fuel cam will be rotated with the air cam through the clutch connections, the air cam being driven through the gears 49, 51 and 52 at one-eighth crank shaft speed in a direction reverse to that in which the crank shaft is rotated. Thus the fuel cam rotates at one-eighth crank shaft speed when the clutch member 54 is in driving relation with the air cam. When the clutch element 54 is moved into driving relation with the element 53, the fuel cam will be rotated through the clutch connections at the same speed as the crank shaft and in the same direction therewith, the air cam continuing to be rotated at one-eighth crank shaft speed. It will thus be seen that the fuel cam can be selectively operated at crank shaft speed or at one-eighth crank shaft speed and that it will not be driven at all when the clutch member is in neutral position, whereupon the engine will stop because fuel injection into the cylinders ceases when the fuel cam ceases to actuate the pump mechanisms.

In order to assist in the vaporization of the liquid fuel charges injected into the cylinders during starting of the engine, I provided glow plugs 62 which are screwed into the head of each cylinder so that the incandescent element thereof projects interiorly of the cylinder and preferably in the path of the fuel so that it will contact therewith. Such glow plugs are grounded to the cylinders and are provided with a terminal 63 to which a wire 64 is connected, such wire extending through a terminal 65 projecting from a control device indicated generally at 66. Extending from the terminal 67 is a wire 68 which leads to the battery 69, the battery being grounded with the engine. A suitable contact element is arranged within the control device for making or breaking contact between the terminals 65 and 67 in order to energize or de-energize the glow plugs.

A conventional form of inertia starter, of a type shown in detail in Patent No. 1,739,469 of December 10, 1929 to Lansing, and indicated generally at 70, is secured to the crank case cover 24 and includes a telescoping shaft 71 having a jaw end arranged to engage the jaw 72 formed at the end of the crank shaft. The motor portion of the inertia starter is housed within the casing 73 and rotation multiplying mechanism extends from the electric motor to the shaft 71, there being friction clutch mechanism in such driving mechanism (not shown). The jaw end of the shaft 71 can be moved axially without affecting its driving relation with the power transmission mechanism, and a rod 74 extends through the housing 75 and is attached to reciprocate the jaw end of the shaft 71, there being a link member 76 extending through the casing 75 which is actuated by mechanism referred to hereinafter. Terminals 77 connect with the inertia starter motor, one of the terminals being grounded with the engine and the other terminal being connected with the terminal 78 extending from the control device by wiring 79. Another terminal 80 extends from the control device and is connected with the battery through wiring 81, there being mechanism within the control device for connecting the terminals 78 and 80.

As hereinbefore stated, the inertia starter and the glow plugs are energized and de-energized through the operation of a single control member, and at the same time the movement of such member controls the operation of the fuel cam speed clutch and moves the jaw of the inertia starter into engagement with the crank shaft jaw. The control device is carried by a housing which consists of the flanged portion 82 of the rear cover 24 and another housing section 83 which is secured to such flange 82 by the screws 84, such housing extending around the outer end of the bearing 60 so that the clutch shaft 59 extends therein.

In order to lock the fuel cam driving clutch in a neutral position, I provide securing mechanism which is preferably arranged interiorly of the housing and includes a shaft 85 which projects through one end of the casing. An operating handle 86 is pinned to the projecting shaft end so that it can be manually rotated. A latch 87 is fixed to the shaft within the housing and is provided with a detent which engages a boss 88 projecting from a sleeve 89 which is adjustably clamped upon the threaded portion of the shaft 59 extending within the housing sections 82 and 83, the adjustment of such sleeve member determining the tension of the spring 61 to allow for manufacturing inaccuracies. When the latch is in the position shown by dotted lines in Fig. 4, the clutch 54 will be locked in neutral position under which circumstance the fuel cam cannot be rotated. By turning the handle 86 in one direction, the shaft 85 will be rotated and the latch will be removed from the boss 88 permitting axial movement of the shaft 59.

In order to maintain the latch in either locked or unlocked positions, I provide an automatic device which consists of a barrel section 90, one end of which is provided with a circular head which seats in a bearing member 91 extending through the casing 82, and a plunger member 92 which telescopes within the open end of the barrel section and is pivotally secured to an ear 93 extending from the latch member. A coil spring 94 is arranged to maintain the plunger in extended relation with the barrel. The barrel head is mounted in a position so that it will exert pressure against the ear to hold the latch in locked relation with the boss 88, or against the wall 24 when the shaft is moved out of locked relation with the boss. It will be seen that as the device is moved with the ear on either side of a line intersecting its seat and the shaft 85, the spring will exert pressure in directions so that the shaft will be maintained in a relation to either cause the latch to remain disengaged or to engage the boss 88. In addition to acting as a locking device for the clutch shaft 59, the latch 87 serves as a cam to engage the boss 88, when the shaft 85 is turned in locking direction by the lever 86, and moves it into a position for engagement with the latch detent, such movement causing the shaft 59 to be moved axially with the boss, into a neutral position. In this manner the latch device serves as a control means for the clutch to cause its disengagement from normal driving relation with the air cam 43 when it is desired to stop the motor.

A shaft 100 extends vertically through the housing section 83 and is provided at one end with a lever 101 by means of which the shaft is rotated, and at the other end with a lever 102 which is connected by a link 103 with the lever and shaft structure 76 for actuating the starter jaw shaft 74. The link 103 is provided with a bifurcated end having slots 104 therein through which a pin 105 extends to pivotally secure the end of the lever 102, so that upon rotation of the shaft 100 in one direction, the pin 105 will slide in the slot in the link 103 and will not affect movement of such link, while rotation of the shaft in the opposite direction will cause the pin to engage the link 103 at one end of the slot and move the same in a direction causing the members 76 and 74 to move the jaw end of the shaft 71 axially into driving engagement with the jaw 72.

It will be seen that when the latch 87 is released from the boss 88, the spring 61 will automatically move the shaft 59 and the arm 58 fixed thereto in a direction to cause the dogs on the clutch 54 to engage with the air cam dogs. If such dogs happen to clash, the spring 61 will cause a driving engagement upon further rotation of the air cam 43.

In order that the dogs on the clutch member 54 will engage those on the clutch element 53, I associate mechanism with the shaft 100 for automatically providing such results. To this end an arm 106 is fixed to the shaft 100 and pivotally carries a rod 107 which is associated with a control member 108 pivotally mounted upon the shaft 100, such control member having a bifurcated end. The bifurcated end of the control member engages flanges 109 which are formed at the end of the shaft 59, and a pin 110 extends transversely through the bifurcated end of the control member and is provided with an aperture through which the rod 107 extends. A nut 111 is screwed upon the end of the rod 107 and thus limits the spaced relation between the arm 106 and the control member, a coil spring 112 being provided intermediate a flange on the rod and the bifurcated end of the actuated member to normally maintain the control member in maximum spaced relation relative to the arm.

It will be seen that rotation of the shaft 100 in one direction will have no effect upon the shaft 59, but rotation of the control shaft 100 in the opposite direction will cause the control member 108 to engage the flanges 109 moving the shaft 59 axially, as shown in dotted lines of Fig. 4, such movement causing the clutch 54 to be moved into engagement with the clutch member 53. Rotation of the shaft 100 in one direction will have no effect upon the shaft 59, while rotation in the other direction will cause the shaft 59 to move the clutch in a direction to drive the fuel cam directly with the crank shaft.

In order to energize and de-energize the inertia starter and the glow plugs, I associate with the shaft 100 means for making and breaking the circuits. A cylinder 113, formed of insulating material, is fixed upon the shaft 100 within the housing formed by the sections 82 and 83. Upon such cylinder is a countersunk contact segment 114 for closing the inertia starter circuit, and a pair of spaced countersunk segmental contact elements 115 for controlling the glow plug circuit, the contact elements 114 and 115 being arranged in spaced relation axially of the cylinder and being secured by the screws 116. The terminals 65 and 67, heretofore referred to, extend through a wall of the casing 83 and are insulated therefrom by washers 117, such terminals extending through an insulated plate 118 and being arranged to secure contact members 119 in a relation for association with the contact segments 115 on the control cylinder. The terminals 78 and 80 are secured through the casing in insulated relation, in a manner similar to the terminals just referred to, and secure contact elements 120 in a relation for association with the contact element 114 of the control cylinder.

The cylinder is provided with a recess 121 and a flat face therein provides a seat for a device which normally maintains the cylinder in a relation such that the contact elements 114 and 115 will not complete the circuits leading to the inertia starter and the glow plugs. The housing 83 is provided with an intergral sleeve 122 into which a control member 123 extends, there being a coil spring 124 arranged within the sleeve and seated against a plug 125 which is screwed into the end of the sleeve and normally exerts pressure to maintain the control member in engagement with the flat surface formed by the recess in the cylinder. It will be seen that the cylinder must be rotated against the pressure of the spring 124 so that when released, the control member 123 will return the cylinder into a circuit breaking position.

When the engine is used as the power plant of an airship, or when a remote control is required, extended operating mechanism is associated with the levers 86 and 101, there being linkage 126 connected to the lever 86 and linkage 127 connected to the lever 101. This linkage can be of any conventional form and, therefore, a showing further than that illustrated in the drawings is not thought to be necessary.

In a Diesel engine, of the character illustrated, air charges entering the cylinder are preferably directed so that they will rotate during the compression stroke and where fuel charges are injected into such rotating air charges under high pressure and in finely atomized condition, such injection is timed preferably so that the delivery period will be completed shortly before the piston reaches top center. It will be also understood that through adjustment of the ring 129, the relation of the rods 37 can be adjusted with respect to the rocker levers 40 to vary the plunger stroke and the quantity of fuel contained in the injected charge, there being suitable mechanism for rotating the ring 129 for this purpose. When the ring is adjusted so that motion transmitted by the rocker levers 40 to the plungers 35 is such that the fuel inlet openings in the plunger barrel are not covered by the plunger, then of course the engine will stop, because no fuel will be injected. Likewise, when the clutch 54 is moved into neutral position, there will be no rotation imparted to the fuel cam 42 and the engine will therefore stop.

As heretofore related, the lever 86 is manipulated to permit the shaft 59 to be actuated, so that the latch 87 must first be released from the boss 88 on the shaft 59 before the engine can be started, such mechanism corresponding in a way to the ignition switch commonly employed with an automobile engine. The locking device associated with the latch 87 normally maintains it in engagement with the boss 88 and consequently the lever 86 must be actuated against the tension of the spring 94 to move the latch out of engagement and permit operation of the shaft 59, such locking device maintaining the latch in a remote relation from the boss after the shaft has been turned to move the ear 93 beyond a line extending centrally through the shaft 85 and the bearing 91. When the latch is removed, the engine can be started, and after the engine has been stopped, the lever 86 is moved in a direction to cause the latch 87 to move the boss 88 into a position where it will again lock the shaft 59 in neutral position.

Figure 6:
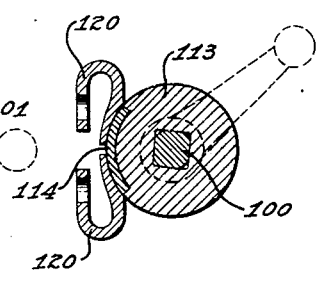
Fig. 6 is a similar view taken on the same line with the cylinder moved into circuit establishing relation.
Figure 7:
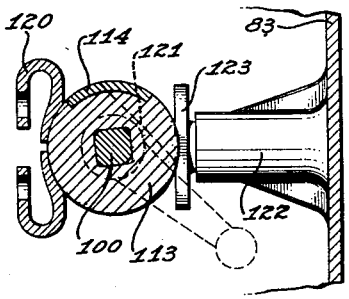
Fig. 7 is a sectional view of the same taken on line A—A showing the cylinder in another position of its adjustment wherein the circuit returning to the starting motor is broken.
Figure 8:
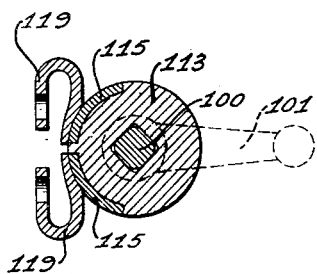
Fig. 8 is a sectional view of the control cylinder taken on line B—B of Fig. 2 showing a neutral contact relation with the glow plug circuit.
Figure 9:
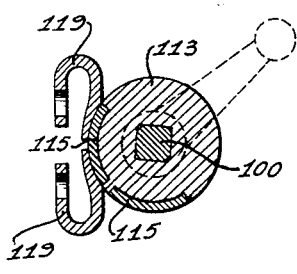
Fig. 9 is a similar sectional view showing the cylinder in one position of adjustment in which the glow plugs are energized.
Figure 10:
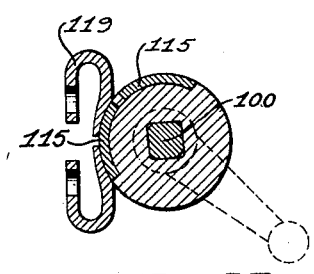
Fig. 10 is a similar sectional view showing the cylinder in another position of adjustment in which the glow plugs are energized.
Figure 11:
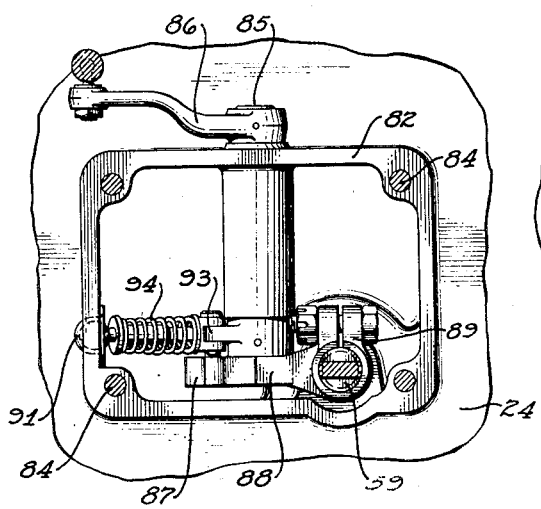
Fig. 11 is a vertical sectional view taken on line 11—11 of Fig. 4.
Figure 12:
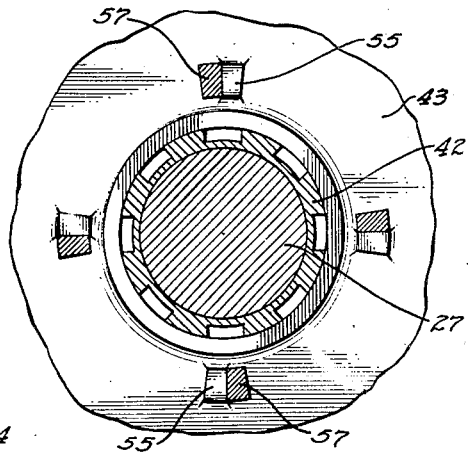
Fig. 12 is a transverse sectional view through the crank shaft on a line substantially intermediate the clutch and the air valve cam.

After the latch 87 has been released from the boss 88, it is only necessary for the operator to actuate the lever 101 in order to start the engine, it being understood, however, that the fuel injection mechanism is set so that there will be a fuel injection. Figs. 5 and 8 show the position in which the control cylinder is normally maintained by the control members, Figs. 6 and 9 illustrate the position in which the cylinder is moved in order to energize both the inertia starter and glow plug circuits, while Figs. 7 and 10 illustrate a position into which the cylinder is moved after energizing the glow plug and inertia starter circuit. As previously stated, the control member 123 normally maintains the cylinder 113 in the position shown in Figs. 5 and 8, and in such position neither of the contact elements 114 and 115 will connect the contact elements 120 and 119. Upon rotation of the shaft 100 in one direction, the cylinder is moved to cause the contact element 114 and one of the contact elements 115 to close the circuit between the contacts 120 and 119, and when the cylinder is moved into such position, the glow plugs and the inertia starter will be energized causing the incandescent wire of the glow plugs to become hot, and also to cause the starter motor to rotate and store up energy for rotating the crank shaft. It will be seen that when the shaft 100 is moved in this direction that the arm 106 will be moved in an anti-clockwise direction so that the actuator 108 does not cause movement of the shaft 59. After the cylinder 113 has been maintained in this position for a short period of time, the glow plugs will have developed some heat within the combustion chamber so that combustion will be assisted thereby to some extent. The shaft 100 is next turned in the opposite direction, or a clockwise direction, whereupon the contact 114 is moved out of circuit making relation with the contacts 120 thereby de-energizing the inertia starter motor.

However, one of the contact segments 115 will maintain the glow plug circuit through its contact with the elements 119, the position of the cylinder under such circumstances being shown in Figs. 7 and 10. Upon movement of the cylinder and shaft 100 in a clockwise direction from the position shown in Figs. 6 and 9 to the position shown in Figs. 7 and 10, the arm 106 will be caused to rotate in a direction such that it will move the actuator 108 in a direction to cause the shaft 59 to be moved into the position, shown by the dotted line at the right of Fig. 4, which will in turn move the clutch 54 into engagement with the clutch element 53 so that the clutch will be moved from engagement with the air cam into a position to drive the fuel cam directly from the crank shaft. As before explained, if the dogs of the clutch strike the dogs of the clutch element 53, the spring 112 will cause driving engagement upon further rotation of the crank shaft, such arrangement preventing breakage and insuring a clutch relation. Furthermore, rotation of the shaft 100 into the position shown in Figs. 7 and 10 will cause the lever 102 to engage and move the link 103 in a direction to cause the jaw 71 to engage with the jaw 72 at the end of the crank shaft, and as the energy stored by the motor in the inertia starter is transmitted to the shaft 71, the crank shaft will be rotated.

It will be seen that under such circumstances, the fuel cam will rotate at crank shaft speed so that the fuel injection plungers are actuated at a speed to cause the fuel charges to be injected under high pressure and in finely atomized condition into sufficiently compressed air to result in ignition even though the fuel charge be minimum and the rotation of the crank shaft be slow, which condition would not be present if the fuel cam were driven at its normal operation rotation which would be one-eighth crank shaft speed and therefore eight times as slow as when operating at crank shaft speed. It will be noted in this connection that there will be eight times as many fuel injections during starting operation of the engine as when the engine is operated under load. The injections occurring during the working, exhaust and suction strokes are of course wasted and obviously have no effect upon the operation of the engine. The timing of the last fuel injection during the air compression stroke corresponds to that of the injection occurring during operation of the engine under load at which time the air charge is compressed sufficiently to produce a temperature which will cause ignition of the mixture. Prior to the time of such injection in the compression stroke, the air is not sufficiently compressed to cause ignition of a mixture and hence fuel injections occurring prior to the last one in the compression stroke will not burn and such injections generally move out of suspension, in liquid form, before the air reaches a temperature which will cause burning. Such condition is usually accentuated by the cold condition of the cylinders when starting. Furthermore, the glow plugs continue to be energized during the first fuel injections and thereby assist in vaporizing the fuel charges so that this helps in assisting starting. The inertia starter is of the character such that it will turn the crank shaft over two or three times, and I have found that this amount of rotation is sufficient to start the combustion in the engine even though surrounding temperature conditions are low.

It will be seen that the method of and mechanism for starting the engine herein described is fool-proof because of the latch 87, and that the starting mechanism and glow plugs are controlled through a single mechanism, the movement of which causes the desired results in a predetermined sequence.

It will be understood that the operator must maintain sufficient force against the lever 101 to maintain the cylinder 113 in the positions shown in Figs. 6 and 9, and in Figs. 7 and 10, and upon manual release of the lever 101, the spring 124 will cause the cylinder and its shaft to move into the position shown in Figs. 5 and 8, so that after combustion has started, the operator releases the lever 101 whereupon the glow plugs are de-energized, the jaw end of the shaft 71 moves away from the crank shaft, and the shaft 59 is moved by the spring 61 to cause the clutch 54 to move away from engagement with the clutch element 53 into engagement with the dogs on the air valve cam, such relation of the clutch changing the fuel cam drive from the crank shaft to the air cam so that the fuel cam will thereby continue rotation at one-eighth crank shaft speed after the starter mechanism has been released. When the engine ceases operation, the lever 86 is moved so that the latch 87 will retain the shaft 59 in locked position.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

What is claimed is:

1. In an internal combustion engine, a fuel injector actuating cam, two engine driven mechanisms operating at different speeds, and a clutch for connecting either of the mechanisms in operating relation with the cam.

2. In an internal combustion engine, a fuel injector actuating cam, engine driven mechanism operating at crank shaft speed, another engine driven mechanism operating at less than crank shaft speed, and a clutch shiftable to associate either of said mechanisms in driving relation with the cam.

3. In an internal combustion engine, a fuel injector actuating cam, an engine driven mechanism, another engine driven mechanism operating at a slower speed than the first mentioned mechanism and including a cam, and a clutch associating the fuel injector actuating cam in driven relation with the high speed mechanism or with the cam of the slower speed mechanism.

4. In an internal combustion engine, a fuel injector actuating cam, two separate engine driven mechanisms operating at different speeds, a clutch for associating either mechanism in driving relation with the cam, and means normally maintaining the clutch in relation associating the slower speed mechanism in driving relation with the clutch.

5. In an internal combustion engine, a fuel injector actuating cam, two engine driven mechanisms operating at different speeds, a clutch for associating either mechanism in driving relation with the cam, and means for locking the clutch out of driving relation with said mechanisms.

6. In an internal combustion engine, a fuel injector actuating cam, mechanism for driving said cam during engine operation, another faster mechanism for driving the cam when starting, and a clutch for engaging either of said mechanisms with the cam.

7. In an internal combustion engine, a fuel injector actuating mechanism comprising a cam freely mounted, another engine driven cam, and a shiftable driving connection between said cams.

8. In an internal combustion engine, a fuel injector actuating mechanism comprising in combination an engine driven cam for operating a valve, another cam for actuating the injector, and a clutch for connecting the injector cam in driven relation either with the valve cam or the engine crank shaft.

9. In an internal combustion engine, a fuel injector actuating cam, two engine driven mechanisms operating at different speeds, a clutch for associating said cam in a driven relation with either mechanism, and spring actuated means normally causing the clutch to assume a driven relation with one of the mechanisms.

10. In an internal combustion engine, a fuel injector actuating cam, two engine driven mechanisms operating at different speeds, a clutch for connecting either mechanism with the cam, and automatic means urging the clutch into a position establishing a driving connection between the cam and the lower speed driving mechanism.

11. In an internal combustion engine, a fuel injector actuating cam, two independent engine driven mechanisms, a clutch for connecting either of said mechanisms in driving relation with the cam, a cam controlling shaft extending exteriorly of the engine crank case and manually operable to shift the clutch into a neutral or a position connecting one of the driving mechanisms with the cam, and a spring associated with the clutch operating shaft normally maintaining the clutch in position establishing actuating engagement between the other of said driven mechanism and the cam.

12. In an internal combustion engine having a crank shaft, a fuel injector actuating cam, a driving element fixed to the crank shaft, driving mechanism including reduction gearing, and a clutch for establishing a connection between the cam and either the driving element or the reduction driving mechanism.

13. In an internal combustion engine, a fuel injector actuating cam, mechanism for driving the cam at two speeds including a clutch, a clutch shifting shaft, a member fixed to the shaft, and a latch for engaging the member to retain the shaft in a position where the clutch is in neutral position.

14. In an internal combustion engine, a fuel injector actuating cam, mechanism for driving the cam at two speeds including a clutch, a slidable shaft for shifting the clutch, an adjustable boss fixed to the shaft, and a latch for engaging the boss, said boss being arranged for engagement by the latch when the clutch is in neutral position.

15. In an internal combustion engine, a fuel injector actuating cam, mechanism for driving the cam at two speeds including a clutch, a slidable shaft for shifting the clutch, a latch for holding the shaft to maintain the clutch in neutral position, and tension means for retaining the latch either in locked or unlocked position.

16. In an internal combustion engine, a fuel injector actuating cam, mechanism for driving the cam at two speeds including a clutch, a slidable shaft for shifting the clutch, a spring normally placing the clutch in relation to connect the cam with one of the driving mechanisms, a projection on the shaft, a latch operable to engage said shaft projection to lock the shaft in neutral, the operation of said latch moving the shaft from its normal spring pressed position into a neutral position through engagement of the latch with the shaft projection, and manually operable means for operating the latch.

17. In an internal combustion engine, a fuel injector actuating cam, mechanisms for driving the cam at two speeds including a clutch, mechanism for shifting the clutch including a shaft, a spring normally maintaining the clutch in driving engagement between the cam and one of the mechanisms, and a latch for moving the shaft against the spring tension into a position where it engages the shaft and retains the clutch in neutral position.

18. In an internal combustion engine, a fuel injector actuating cam, two mechanisms for driving the cam at different speeds, a clutch mechanism for connecting the cam with either of said mechanisms, a spring normally retaining the clutch in engaging relation with one of the driving mechanisms, and tension means for moving the clutch into engagement with the other driving mechanism.

19. In an internal combustion engine, a fuel injector actuating cam, two mechanisms for driving the cam at different speeds, a clutch mechanism connected to drive the cam and shiftable into driving engagement with either of said mechanisms, a spring for maintaining the clutch in engagement with one of the mechanisms, and clutch shifting means including a tension arm.

20. In an internal combustion engine, a fuel injector actuating cam, two cam driving mechanisms, a clutch connecting the cam with either mechanism, a spring normally causing the clutch to connect the cam with one of the mechanisms, a shaft for shifting the clutch, and a tension device for shifting the shaft to move the clutch away from its normal relation, said device being manually actuated.

21. In an internal combustion engine, a fuel injection mechanism for moving fuel into a combustion chamber under high pressure, a cam arranged to actuate said mechanism, and selective means connected with the engine to drive the cam in opposite directions.

22. In an internal combustion engine, a fuel injection mechanism for moving fuel into a combustion chamber under pressure, a cam arranged to actuate said mechanism, and engine driven mechanism for rotating said cam at different speeds relative to the crank shaft speed.

23. In an internal combustion engine, a fuel injection mechanism for moving fuel into a combustion chamber under pressure, a cam arranged to actuate said mechanism, and engine driven mechanism for rotating said cam at different speeds and in opposite directions.

24. In a Diesel engine having a crank shaft and fuel pump injection mechanism devices, a battery, an actuator for the fuel injection devices, engine driven mechanism for selectively operating the actuator at different speeds relative to crank shaft rotation including a clutch, an inertia starter adapted to be associated with the crank shaft and connected to the battery, and a manually controlled means for connecting or disconnecting the battery and the starter and for shifting the clutch into position for causing the mechanism to be driven at either speed.

25. In a Diesel engine having a crank shaft and fuel pump injection devices, a battery, an actuator for fuel injection devices, engine driven mechanism for operating the actuator at different speeds relative to crank shaft rotation including a shiftable clutch, a motor driven inertia starter adaptd to be connected in circuit with the battery, a shiftable jaw for engaging the crank shaft rotated by the starter, and a manually operated means the movement of which controls the circuit between the battery and the starter, controls the clutch position, and shifts the starter driving jaw into driving relation with the crank shaft.

26. In a Diesel engine having a crank shaft and fuel pump injection devices, a battery, an actuator for the fuel injection devices, engine driven mechanism for operating the actuator at different speeds relative to crank shaft rotation including a shiftable clutch, a motor driven inertia starter adapted to be connected in circuit with the battery, a shiftable starter driven jaw for engaging the crank shaft, glow plugs associated with the engine combustion chambers and adapted to be connected in circuit with the battery, and a control member the movement of which establishes and breaks the circuit from the battery to the starter and the glow plugs, and which actuates the clutch and which shifts the driving starter jaw into driving relation with the crank shaft.

27. In a Diesel engine having a crank shaft and fuel pump injection devices, a battery, an actuator for the fuel injection devices, engine driven mechanism for operating the actuator at different speeds relative to crank shaft rotation including a clutch, a shiftable driving jaw for engaging and rotating the crank shaft, glow plugs associated with the engine combustion chambers and adapted to be connected in circuit with the battery, and manually actuated control means the movement of which connects or disconnects the glow plugs with the battery and also shifts the driving jaw.

28. In a Diesel engine having a crank shaft and fuel pump injection devices, a battery, an actuator for the fuel injection devices, engine driven mechanism for operating the actuator at different speeds relative to crank shaft rotation including a shiftable clutch, glow plugs associated with the engine combustion chambers and adapted to be connected in circuit with the battery, and a manually operated means for controlling the connection between the glow plugs and the battery and the position of the clutch.

29. In a Diesel engine having a crank shaft and fuel pump injection devices, a battery, a motor driven inertia starter adapted to be connected in circuit with the battery, a shiftable shaft rotated by the inertia starter and adapted to engage with the crank shaft, glow plugs associated with the engine combustion chambers and adapted to be connected in circuit with the battery, and a manually operable control means, the movement of said control means controlling the circuit between the battery and the starter and between the battery and the glow plugs, and also shifting the shaft into driving engagement with the crank shaft.

30. In a Diesel engine having a crank shaft and fuel pump injection devices, a battery, glow plugs associated with the engine combustion chambers and adapted to be connected in circuit with the battery, a starter shaft adapted to be shifted into driving relation with the crank shaft, and a manually operable means controlling circuit between the battery and the glow plugs and for moving the driving shaft into driving engagement with the crank shaft.

31. In a Diesel engine having a crank shaft and fuel pump injection mechanism devices, a battery, an actuator for the fuel injection devices, engine driven mechanism for selectively operating the actuator at different speeds relative to crank shaft rotation including a clutch, and inertia starter adapted to be associated with the crank shaft and connected to the battery, and a manually controlled rotatable cylinder for connecting or disconnecting the battery and the starter and for shifting the clutch into position for causing the mechanism to be driven at either speed.

32. In a Diesel engine having a crank shaft and fuel pump injection devices, a battery, an actuator for fuel injection devices, engine driven mechanism for operating the actuator at different speeds relative to crank shaft rotation including a shiftable clutch, a motor driven inertia starter adapted to be connected in circuit with the battery, a shiftable jaw for engaging the crank shaft rotated by the starter, and a manually operated rotatable cylinder the movement of which controls the circuit between the battery and the starter, controls the clutch position, and shifts the starter driving jaw into driving relation with the crank shaft.

33. In a Diesel engine having a crank shaft and fuel pump injection devices, a battery, an actuator for fuel injection devices, engine driven mechanism for operating the actuator at different speeds relative to crank shaft rotation including a shiftable clutch, motor driven inertia starter adapted to be connected in circuit with the battery, a shiftable starter driven jaw for engaging the crank shaft, glow plugs associated with the engine combustion chambers and adapted to be connected in circuit with the battery, and a rotatable cylinder the movement of which establishes and breaks the circuit from the battery to the starter and the glow plugs, and which actuates the clutch and which shifts the driving starter jaw into driving relation with the crank shaft.

34. In a Diesel engine having a crank shaft and fuel pump injection devices, a battery, an actuator for the fuel injection devices, engine driven mechanism for operating the actuator at different speeds relative to crank shaft rotation including a clutch, a shiftable driving jaw for engaging and rotating the crank shaft, glow plugs associated with the engine combustion chambers and adapted to be connected in circuit with the battery, and a manually actuated rotatable control cylinder which connects or disconnects the glow plugs with the battery and also shifts the driving jaw and the clutch.

35. In a Diesel engine having a crank shaft and fuel pump injection devices, a battery, an actuator for the fuel injection devices, engine driven mechanism for operating the actuator at different speeds relative to crank shaft rotation including a shiftable clutch, glow plugs associated with the engine combustion chambers and adapted to be connected in circuit with the battery, and a manually operated rotatable cylinder for controlling the connection between the glow plugs and the battery and the position of the clutch.

36. In a Diesel engine having a crank shaft and fuel pump injection devices, a battery, a motor driven inertia starter adapted to be connected in circuit with the battery, a shiftable shaft rotated by the inertia starter and adapted to engage with the crank shaft, glow plugs associated with the engine combustion chambers and adapted to be connected in circuit with the battery, and a manually operable control rotatable cylinder, the movement of said rotatable cylinder controlling the circuit between the battery and the starter and between the battery and the glow plugs, and also shifting the shaft into driving engagement with the crank shaft.

37. In a Diesel engine having a crank shaft and fuel pump injection devices, a battery, glow plugs associated with the engine combustion chambers and adapted to be connected in circuit with the battery, a starter shaft adapted to be shifted into driving relation with the crank shaft, and a manually operable rotatable cylinder controlling the circuit between the battery and the glow plugs and for moving the driving shaft into driving engagement with the crank shaft.

38. In a Diesel engine having a crank shaft and fuel pump injection devices, an actuator for the fuel injection devices, engine driven mechanism for operating the actuator at different speeds relative to crank shaft rotation, a shiftable clutch for connecting the actuator with the desired speed transmission mechanism, a rotatable circuit controlling cylinder, and an operating connection between the cylinder and the clutch, said clutch being positioned in a definite relation with the position of the cylinder.

39. In a Diesel engine having a crank shaft and fuel pump injection devices, a rotatable cylinder for controlling the speed of operation of said fuel pump devices relative to the crank shaft rotation, a plurality of circuits controlled by said cylinder, and a tension member normally maintaining said cylinder in a position breaking said circuits and urging the return of said cylinder to normal position when in a remote relation.

40. In a Diesel engine having a crank shaft and fuel pump injection devices, a starter circuit, a glow plug circuit, a rotatable cylinder for controlling said circuits, and tension means associated with the cylinder in a relation normally urging the same into a circuit breaking position.

41. In a radial Diesel engine, a crank case having a removable end plate, starter mechanism carried by the end plate, a selective two speed fuel pump actuating mechanism, and a control means for the starter and the fuel injection operating means carried by the removable end plate.

42. In a Diesel engine having a crank shaft and fuel pump injection devices, a battery, a starter adapted to be connected in circuit with the battery, glow plugs associated with the engine combustion chambers and adapted to be associated in circuit with the battery, and a single control member normally maintaining the battery in a disconnected relation with the starter and glow plugs, the movement of the control means in one position establishing the circuits between the battery and the glow plugs and the starter, and the movement of the control means into another position establishing only the circuit between the glow plugs and the battery.

43. In a Diesel engine having a crank shaft and fuel pump injection devices, a battery, glow plugs associated with the engine combustion spaces and adapted to be placed in circuit with the battery, an inertia starter having a shiftable jaw, said starter being adapted to be arranged in circuit with the battery, and a control member for the circuits and connected to shift the starter jaw, the movement of said member into one position connecting the starter and glow plugs in circuit with the battery, and the movement of said member into another position maintaining the glow plug circuit and causing movement of the starter jaw into driving relation with the engine crank shaft.

44. In a Diesel engine having a crank shaft and fuel pump injection devices, a battery, mechanism including a clutch for driving the fuel injection devices from the crank shaft at different speeds, an inertia starter adapted to be connected in circuit with the battery and having a shiftable jaw for engaging and driving the crank shaft, glow plugs associated with the engine cylinders and adapted to be connected in circuit with the battery, and a control member having a connection for axially shifting the starter jaw shaft, the movement of said member in one direction establishing circuits between the battery and the glow plugs and starter, and movement of said member in the other opposite direction establishing a circuit between the battery and glow plugs connecting the higher speed mechanism to operate the fuel pump injection devices and shifting the starter jaw shaft into driving relation with the crank shaft.

45. In a Diesel engine having a crank shaft and fuel pump injection devices, a battery, an actuator for fuel injection devices, mechanism including a clutch for transmitting rotation to the actuator at different speeds from the crank shaft, an inertia starter adapted to be connected in circuit with the battery, and a single member normally in position to disconnect the circuit, the movement of said member into one position establishing the circuit and movement of the member into another position causing the higher speed actuator driving mechanism to be effective.

46. In a Diesel engine having a crank shaft and fuel pump injection devices, a battery, an inertia starter adapted to be arranged in circuit with the battery and having an axially shiftable driving jaw, mechanism including a clutch for driving the fuel pump injection devices at two speeds, and a single control member manually movable into a position establishing the circuit between the battery and the starter and when moved in reverse direction breaking such circuit and causing the fuel pump operating mechanism to be driven at the higher speed and to shift the starter jaw into driving relation with the crank shaft.

47. In a Diesel type engine, a cylinder in which air charges are compressed, an injection device for spraying fuel into the compressed air charges in the cylinder including a pump, engine driven mechanism for actuating the pump in its injection strokes, and engine driven means for actuating the pump at a speed greater when starting the engine than the speed at which the said mechanism would actuate the same.

48. In a compression ignition engine in which the fuel injections occur through pressure induced by an engine driven part, the method of forming fuel charges comprising the introduction and compression of air in the engine cylinders; injecting liquid fuel into the compressed air charges, after the engine has been started, under a pressure varying with the engine speed; and injecting atomized liquid fuel into the compressed air charges, during starting of the engine, under a higher pressure than that induced when the engine is operating at a similar speed under its own power.

49. In a compression ignition engine in which the fuel injection occurs through pressure induced by an engine driven part, the method of forming fuel charges comprising the introduction and compression of air in the engine cylinders; injecting fuel under a pressure in a range varying with the engine speed above a predetermined speed range; and injecting fuel in a pressure range, during starting, which is higher than that induced when the engine is running at a similar speed under its own power.

50. In a compression ignition engine in which the fuel injections occur through pressure induced by an engine driven part, the method of forming fuel charges comprising the introduction and compression of air in the engine cylinders; injecting liquid fuel into the compressed air charges, after the engine is running under its own power, in a pressure range varying with the speed; and injecting liquid fuel into the compressed air, during starting of the engine, in a pressure range materially higher in relation to the engine speed than when the engine is running at a similar speed under its own power.

51. In a compression ignition engine in which the fuel injections occur through pressure induced by an engine driven part, the method of forming fuel charges comprising the introduction and compression of air in the cylinders; injecting liquid fuel into the compressed air charges, after the engine has started, under a pressure changing with the engine speed; and injecting liquid fuel into the compressed air charges, during starting of the engine, under a pressure several times that which would be induced by the engine when running under its own power at a similar speed.

52. In a compression ignition engine in which the fuel injections occur through pressure induced by an engine driven part, the method of forming fuel charges comprising the introduction and compression of air in the engine cylinders; injecting liquid fuel into the compressed air charges in the cylinders after the engine is running under its own power, at a pressure causing a material penetration of the compressed air charges; and injecting liquid fuel into the compressed air charges in the cylinders, during slow speed starting of the engine, at a pressure causing a penetration of the compressed air charges sufficient to support combustion and materially greater than would be induced when the engine is running under its own power at a similar speed.

53. In a compression ignition engine in which the fuel injections occur through pressure induced by an engine driven part, the method of forming fuel charges comprising the introduction and compression of air in the engine cylinders; injecting liquid fuel into the compressed air charges in the cylinders after the engine is running under its own power, in one range of atomization varying in degree with the engine speed; and injecting liquid fuel into compressed air charges in the cylinder, during slow speed starting of the engine, in a range of atomization more minute than that produced in the other range when the engine is running under its own power at the same speed.

54. In a compression-ignition engine, a crank shaft, a cam, independent means adapted to be connected to drive the cam from the crank shaft at different speeds relatively, and fuel injection means associated to be actuated by said cam.

55. In a compression-ignition engine, a crank shaft, a cam, a pair of driving mechanisms adapted to be associated between the crank shaft and the cam, means for placing either of said mechanisms in driving relation, and a fuel injection device associated with the cam to be actuated thereby.

56. In a Diesel engine having a crank shaft and fuel pump injection devices, a battery, a starter adapted to be connected in circuit with the battery, glow plugs associated with the engine combustion chambers and adapted to be associated in circuit with the battery, and a control member for the circuit, one position of the control member establishing both circuits, another position of the control member establishing only the glow plug circuit, and another position of the control member disconnecting both circuits.

57. In an internal combustion engine, the combination with an engine starter, of a circuit for controlling the operation of the starter, incandescent heating elements for the charges, a circuit for controlling the operation of said heating elements, and a switch member for energizing both of said circuits, said switch member being operable to maintain energization of said heating element circuit after the starter circuit is broken.

LIONEL M. WOOLSON.